May 26, 1931.   S. G. LING   1,806,999
AUTOMATIC VALVE LUBRICATOR
Filed July 23, 1930    2 Sheets-Sheet 1

Inventor
Stephen G Ling
By *Clarence A. O'Brien*
Attorney

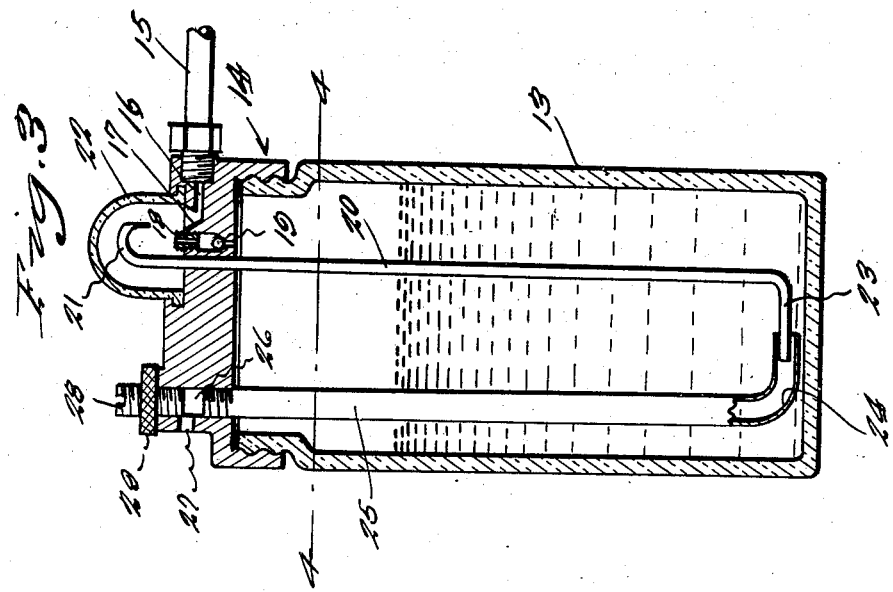

Patented May 26, 1931

1,806,999

UNITED STATES PATENT OFFICE

STEPHEN G. LING, OF LOS ANGELES, CALIFORNIA

AUTOMATIC VALVE LUBRICATOR

Application filed July 23, 1930. Serial No. 470,046.

This invention relates to automotive appliances in general and has more specific reference to an appliance or device which is expressly intended for introducing a lubricant into the intake manifold for lubricating the cylinder walls, pistons and valves.

Generally stated, the invention involves a specific construction incorporated in the lubricator which automatically increases the amount of oil entering the motor as the vacuum is reduced.

It is a matter of common knowledge that the high or highest vacuum is reached when the motor is idling, especially when coasting, or whenever the throttle is closed. In this instance, very little lubricating oil is needed as the motor is not laboring. On the other hand, when the motor is extended or when the throttle is opened, such as on a hill or at high speed, the vacuum reduces according to the opening of the throttle. It is therefore very essential that the motor receive more oil at this particular phase of operation.

Briefly stated, I have evolved and produced a simple and economical lubricator which is automatically controlled and which positively increases the amount of oil to the motor as the vacuum is reduced, the construction being such as to render it comparatively simple and economical, efficient and sturdy and susceptible of installation on the cowl, motor, instrument board or elsewhere.

In the accompanying drawings, in which like numerals are employed to designate like parts throughout the same:

Figure 3 is a vertical section on the line 3—3 of Figure 2.

Figure 4 is a horizontal section on the line 4—4 of Figure 3.

Figure 5 is an end view of the discharge end or gooseneck of the oil elevating tube.

Figure 1:
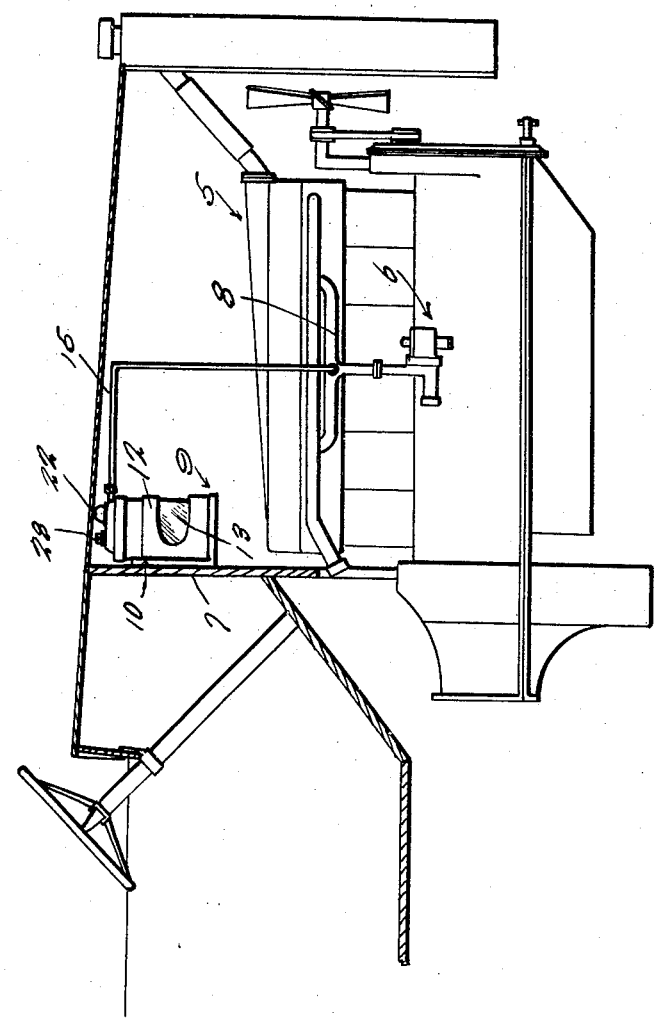
Figure 1 is an elevational view of an automobile motor and the lubricator constructed in accordance with the present invention mounted on the dashboard, and operatively connected with the intake manifold.
Figure 2:
Figure 2 is a top plan view of the lubricator per se.

In the drawings, in Figure 1, the reference character 5 designates generally a conventional motor, 6 a carbureter, 7 a dashboard, and 8 the intake manifold. The attaching device comprises a bracket 9 including a circular base plate, and an upstanding upright 10 having vertical retention channels for the hooked ends 11 of the free end portion of the jar encircling band 12.

The preferred form of the invention comprises a glass jar or an analogous container 13 which is screw threaded at its upper end to accommodate the especially cast cap or cover 14. On one side, the cover is constructed to accommodate the delivery pipe 15. This is tapped into a screw threaded opening in the periphery of the cap and extends down and has communicating connection with the intake manifold as represented in Figure 1. It communicates with the inlet passage 16 which is provided with a drip depression 17.

At this point, the bored plug 18 co-operating with a recess containing a valve seat and a ball check valve 19. Extending through the cover at this point is the upper end of an oil elevating tube 20 having a gooseneck 21 formed at its upper end with its discharge end located directly over the collection drip pocket 17. The numeral 22 designates a glass dome serving as a housing for these details.

The lower laterally directed intake end of the tube 20 indicated at 23 projects into the discharge end 24 of a vertical air intake pipe 25. This pipe extends up and is threaded into an opening 26 in the cap which communicates with an air inlet port 27. The numeral 28 designates a regulating valve for this port and 29 a locknut for holding the valve in an adjusted state.

Ball check 19, Figure 3, is operated by gravity, using no springs or adjustments, it is vital that this ball and hole in which it operates be of just certain sizes as this controls the increase or decrease of oil at high or low vacuum. This ball check serves as a vacuum equalizer or controller. At high vacuum this ball is raised permitting air to be drawn from the container. Therefore, if air is discharging at point 24 less oil can enter tube 20. On the other hand at reduced vacuum this ball seats cutting off the flow of air, discharging from the tube 25 and placing the full force of the vacuum on tube 20. In this case the engine will draw much more oil.

It is understood that air enters through the valved regulating port 27, the valve being regulated as desired and permitting the air to flow down through the perpendicular air pipe 25. The air valve is adjusted to permit whatever flow of oil is desired at idling. The adjustment means that at full vacuum, the air coming into the pipe 25 will allow only a certain predetermined amount of oil to enter into the elevating tube 20.

As the vacuum is reduced from the motor, less air is naturally drawn into the pipe 25. Therefore, more oil will enter the tube 20. The results are approximately as follows:

As an illustration, with the adjustment valve set for approximately four drops per minute at the gooseneck and pocket 17 when idling at about seventeen to twenty inches of vacuum, when the vacuum drops to ten inches approximately ten drops per minute will drop into the pocket. At five inches vacuum there will be twenty drops and at one inch thirty drops, etc. The ball check valve 19 must be of a selected size and weight so as to divert just enough of vacuum to the tube 20 as the check valve seats and the vacuum gradually reduces.

Hence it will be seen that I have evolved and produced an automatic lubricator which increases the amount of oil entering the motor by using the strong vacuum to hold back the oil and a weakened vacuum permitting more oil to enter the delivery pipe 15.

It is thought that persons skilled in the art to which the invention relates will be able to obtain a clear understanding of the invention after considering the description in connection with the drawings. Therefore, a more lengthy description is regarded as unnecessary.

Minor changes in shape, size, and rearrangement of details coming within the field of invention claimed may be resorted to in actual practice if desired.

I claim:

1. In a structure of the class described, an oil container, a cover therefor having an air port, a regulating valve for said port, an air pipe connected to and in communication with the port and depending into said container and terminating in a laterally directed discharge end, an oil delivery pipe connected with said cover, an oil elevating pipe extending upwardly through the cover and terminating in a gooseneck dropper in communication with said delivery pipe, the lower end of said elevating pipe depending into the container and telescoping into the adjacent end of said discharge pipe.

2. In a structure of the class described, an oil container, a cover therefor having an air port, a regulating valve for said port, an air pipe connected with and in communication with the port depending into said container and terminating in a laterally directed discharge end, an oil delivery pipe connected with said cover, an oil elevating pipe extending upwardly through the cover and terminating in a gooseneck dropper in communication with said delivery pipe, the lower end of said elevating pipe depending into the container and telescoping into the adjacent discharge end of said air pipe, and a check valve in said cover in communication with said container and located for co-operation with said oil delivery pipe.

3. In a structure of the class described, an oil container having a cover provided with an oil drip pocket and an associated passage, an oil delivery pipe connected with said cover and in communicating relationship with the passage, an air regulation check valve located in said pocket, an oil elevating pipe depending into the container and having a gooseneck on its upper end with the discharge end located over said pocket, together with valved air delivery means carried by the cover and depending into the container.

4. In a structure of the class described, in combination, a container, a cover therefor, said cover being provided with an oil release passage having a drip pocket at its inner end, an oil delivery pipe connected with the cover and in communication with the outer end of said passage, said cover being formed with a recess adjacent the pocket, an apertured plug tapped into said recess, a ball check valve in said recess co-operable with said plug, said recess being in communication with the interior of said container, an oil elevating tube depending into the container and having a gooseneck on its upper end discharging into said pocket.

5. In a structure of the class described, in combination, a container, a cover therefor, said cover being provided with an oil release passage having a drip pocket at its inner end, an oil delivery pipe connected with the cover and in communication with the outer end of said passage, said cover being formed with a recess adjacent the pocket, an apertured plug tapped into said recess, a ball check valve in said recess co-operable with said plug, said recess being in communication with the interior of said container, an oil elevating tube depending into the container and having a gooseneck on its upper end discharging into said pocket, a transparent housing dome over said gooseneck and pocket as well as said check valve.

6. In a structure of the class described, in combination, a container, a cover therefor, said cover being provided with an oil release passage having a drip pocket at its inner end, an oil delivery pipe connected with the cover and in communication with the outer end of said passage, said cover being formed with a recess adjacent the pocket, an apertured plug tapped into said recess, a ball check valve in said recess co-operable with said plug, said recess being in communication with the interior of said container, an oil elevating tube depending into the container and having a gooseneck on its upper end discharging into said pocket, a transparent housing dome over said gooseneck and pocket as well as said check valve, a valved air inlet, and an air conducting pipe connected therewith and depending into the container and terminating in a laterally directed end, the elevating tube having an adjacent lateral end projecting into said first named lateral end.

In testimony whereof I affix my signature.

STEPHEN G. LING.